(12) United States Patent
Ajiro (10) Patent No.: US 11,574,210 B2
(45) Date of Patent: Feb. 7, 2023

(54) BEHAVIOR ANALYSIS SYSTEM, BEHAVIOR ANALYSIS METHOD, AND STORAGE MEDIUM

(71) Applicant: NEC Corporation, Tokyo (JP)

(72) Inventor: Yasuhiro Ajiro, Tokyo (JP)

(73) Assignee: NEC CORPORATION, Tokyo (JP)

( * ) Notice: Subject to any disclaimer, the term of this patent is extended or adjusted under 35 U.S.C. 154(b) by 586 days.

(21) Appl. No.: 16/614,829

(22) PCT Filed: May 23, 2017

(86) PCT No.: PCT/JP2017/019193
§ 371 (c)(1),
(2) Date: Nov. 19, 2019

(87) PCT Pub. No.: WO2018/216100
PCT Pub. Date: Nov. 29, 2018

(65) Prior Publication Data
US 2020/0210863 A1    Jul. 2, 2020

(51) Int. Cl.
*G06N 20/00* (2019.01)
*G06N 5/04* (2023.01)

(52) U.S. Cl.
CPC ............... *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| | | | |
|---|---|---|---|
| 10,108,296 B2 | 10/2018 | Katsuki et al. | |
| 2017/0279907 A1* | 9/2017 | Kita | ................. G01P 13/00 |
| 2019/0286816 A1* | 9/2019 | Fu | .................. G06F 21/552 |

FOREIGN PATENT DOCUMENTS

| | | |
|---|---|---|
| JP | 2002259168 A | 9/2002 |
| JP | 2008192091 A | 8/2008 |
| JP | 2011138422 A | 7/2011 |
| JP | 2016058027 A | 4/2016 |
| WO | 2015159926 A1 | 10/2015 |

OTHER PUBLICATIONS

Takemori, K., et al., "An Anomaly Detection Technique for IDS Events using Deviations of Information Entropy", IPSJ SIG Technical Report, 2004-CSEC-25, 2004, vol. 2004, No. 54, pp. 31-36 (6 pages).
International Search Report dated Jul. 25, 2017 from the International Bureau in application No. PCT/JP2017/019193.

\* cited by examiner

*Primary Examiner* — Adnan M Mirza
(74) *Attorney, Agent, or Firm* — Sughrue Mion, PLLC (57) ABSTRACT

Provided is a behavior analysis system including: a generation unit that generates a behavior data group including a plurality of behavior data on an analysis target basis; a conversion unit that converts the behavior data group of each of a plurality of analysis targets by converting a parameter which depends on the analysis target out of parameters included in the behavior data group into a parameter which does not depend on the analysis target; and an analysis unit that performs analysis by using the converted behavior data group of the plurality of analysis targets.

6 Claims, 8 Drawing Sheets

| Date and time | Destination | File is attached |
|---|---|---|
| 2017/1/13 10:52:59 | xxx@abcd.com | No |
| 2017/1/13 15:01:48 | yyy@efgh.com | Yes |
| 2017/1/14 09:31:11 | zzz@ijkl.com | No |
| 2017/1/15 09:59:01 | xyz@abcd.com | No |
| 2017/1/15 16:15:32 | vvv@efgh.com | No |
| 2017/1/17 15:21:50 | yyy@efgh.com | Yes |
| 2017/1/18 13:12:10 | nnn@lmn.com | No |
| 2017/1/18 14:05:26 | xxx@abcd.com | Yes |

FIG. 5

| Date and time | Destination | Destination is recorded | File is attached |
|---|---|---|---|
| 2017/1/13 10:52:59 | xxx@abcd.com | No | No |
| 2017/1/13 15:01:48 | yyy@efgh.com | No | Yes |
| 2017/1/14 09:31:11 | zzz@ijkl.com | No | No |
| 2017/1/15 09:59:01 | xyz@abcd.com | No | No |
| 2017/1/15 16:15:32 | vvv@efgh.com | No | No |
| 2017/1/17 15:21:50 | yyy@efgh.com | Yes | Yes |
| 2017/1/18 13:12:10 | nnn@lmn.com | No | No |
| 2017/1/18 14:05:26 | xxx@abcd.com | Yes | Yes |

BEHAVIOR ANALYSIS SYSTEM, BEHAVIOR ANALYSIS METHOD, AND STORAGE MEDIUM

This application is a National Stage Entry of PCT/JP2017/019193 filed on May 23, 2017, the contents of all of which are incorporated herein by reference, in their entirety.

TECHNICAL FIELD

The present invention relates to a behavior analysis system, a behavior analysis method, and a storage medium.

BACKGROUND ART

Technologies to perform anomaly detection or the like by detecting a feature from a pattern of a plurality of data indicating behavior of users or devices are known. Patent Literature 1 discloses a data processing device that detects a feature from operations performed by a user who operates a mobile terminal or the like.

The data processing device of Patent Literature 1 has a sequence acquisition unit, a fragmentation unit, a pattern extraction unit, and a generation unit. The sequence acquisition unit acquires a data sequence in which a plurality of data are arranged. The fragmentation unit fragments the data sequence to obtain a plurality of divided data sequences. The pattern extraction unit extracts a plurality of patterns of one or more data that appear in at least one of the plurality of divided data sequences. The generation unit generates a feature vector having an element value that is different for each of the plurality of divided data sequences in accordance with whether or not each of the plurality of patterns is included. Thereby, it is possible to generate a feature vector to detect a feature from time series data indicating a phenomenon whose occurrence time is temporally irregular.

CITATION LIST

Patent Literature

PTL 1: Japanese Patent Application Laid-Open No. 2016-58027

SUMMARY OF INVENTION

Technical Problem

In the technology disclosed in Patent Literature 1, however, it may be difficult to perform suitable modeling for some types of parameters included in data when trying to detect a feature that appears commonly to behavior of a plurality of users or devices.

The present invention has been made in view of the problems described above and intends to provide a behavior analysis system, a behavior analysis method, and a storage medium that can perform more suitable modeling when detecting a feature that appears commonly to behavior of a plurality of users or devices.

Solution to Problem

According to one example aspect of the present invention, provided is a behavior analysis system including: a generation unit that generates a behavior data group including a plurality of behavior data on an analysis target basis; a conversion unit that converts the behavior data group of each of a plurality of analysis targets by converting a parameter which depends on the analysis target out of parameters included in the behavior data group into a parameter which does not depend on the analysis target; and an analysis unit that performs analysis by using the converted behavior data group of the plurality of analysis targets.

Advantageous Effects of Invention

According to the present invention, it is possible to provide a behavior analysis system, a behavior analysis method, and a storage medium that can perform more suitable modeling when detecting a feature that appears commonly to behavior of a plurality of users or devices.

DESCRIPTION OF EMBODIMENTS

Example embodiments of the present invention will be described below with reference to the drawings. Note that, throughout the drawings described below, elements having the same function or corresponding functions are labeled with the same references, and the duplicated description thereof may be omitted.

First Example Embodiment

A behavior analysis system and a behavior analysis method according to a first example embodiment of the present invention will be described by using FIG. 1 to FIG. 6.

Figure 1:
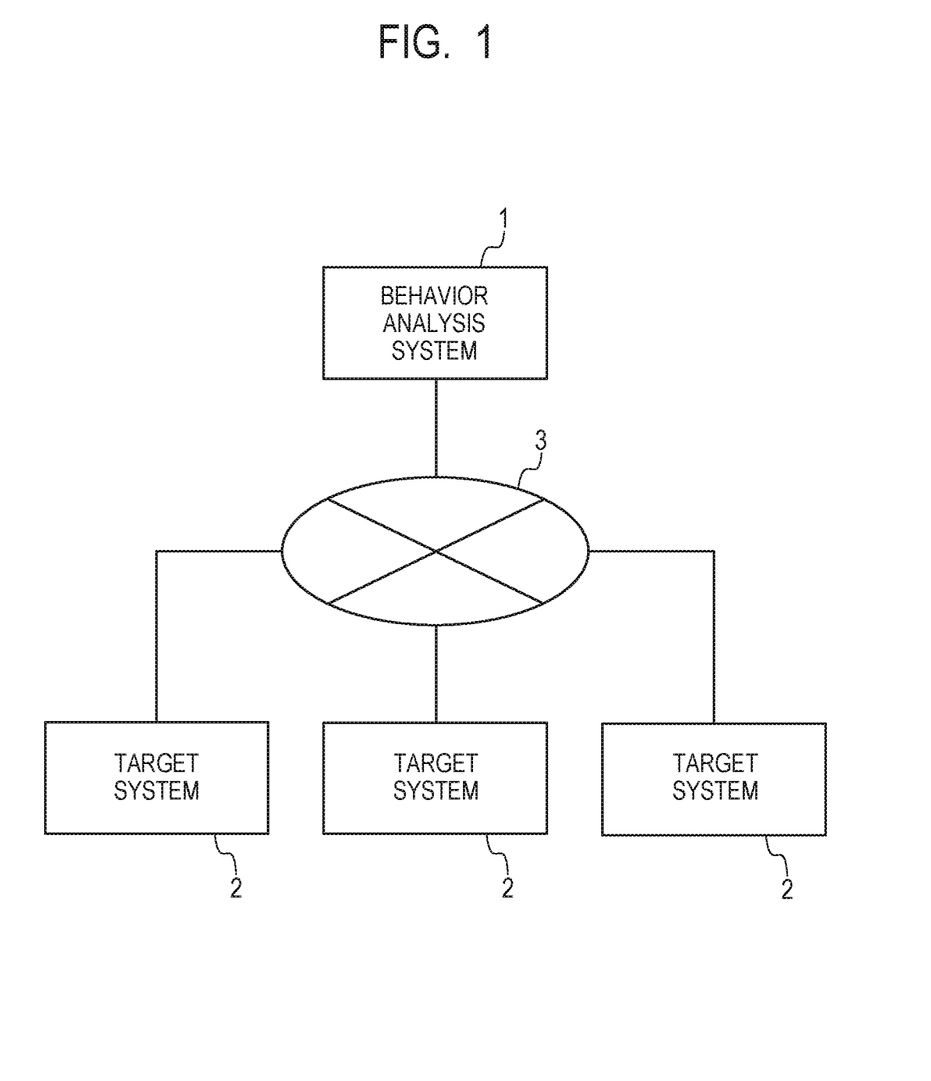
FIG. 1 is a schematic diagram illustrating a behavior analysis system and a target system according to a first example embodiment of the present invention.

First, a general configuration including the behavior analysis system according to the present example embodiment and a target system that is a target of behavior analysis will be described by using FIG. 1. FIG. 1 is a schematic diagram illustrating the behavior analysis system and the target system according to the present example embodiment.

As illustrated in FIG. 1, one or a plurality of target systems 2 that generate and output logs to be processed by a behavior analysis system 1 are communicably connected to the behavior analysis system 1 according to the present example embodiment via a network 3. While the network 3 is a Local Area Network (LAN) or a Wide Area Network (WAN), for example, the type thereof is not limited. Further, the network 3 may be a wired network or may be a wireless network.

Each of the target systems 2 is not limited to a particular system but may be an Information Technology (IT) system, for example. The IT system is formed of a device such as a server, a client terminal, a network device, or other information devices and software such as system software, application software, or the like that operates on the device. The target system 2 generates a log that records behavior (behavior history) such as behavior of a device in operation, behavior of a user using the target system 2, human behavior acquired by the target system 2, or the like. A log generated by the target system 2 is input to and processed in the behavior analysis system 1 according to the present example embodiment. Note that the number of devices, users, or the like that are analysis target of the behavior analysis system 1 may be plural. In such a case, logs are generated on an analysis target basis.

The behavior analysis system 1 according to the present example embodiment is input with logs generated by the target systems 2 via the network 3. The manner in which a log is input to the behavior analysis system 1 from the target system 2 is not particularly limited and may be appropriately selected in accordance with the configuration or the like of the target system 2.

For example, a notification agent in the target system 2 may transmit a log generated by the target system 2 to the behavior analysis system 1, and thereby the log can be input to the behavior analysis system 1. A protocol for transmitting a log is not particularly limited and may be appropriately selected in accordance with the configuration or the like of a system that generates the log. For example, a syslog protocol, File Transfer Protocol (FTP), File Transfer Protocol over Transport Layer Security (TLS)/Secure Sockets Layer (SSL) (FPTS), or SSH (Secure Shell) File Transfer Protocol (SFTP) may be used as a protocol. Further, the target system 2 shares a generated log with the behavior analysis system 1, and thereby the log can be input to the behavior analysis system 1. A scheme of file sharing for sharing a log is not particularly limited and may be appropriately selected in accordance with the configuration or the like of a system that generates the log. For example, file sharing by Server message Block (SMB) or Common Internet File System (CIFS) extended from SMB may be used.

Note that the behavior analysis system 1 according to the present example embodiment is not necessarily required to be communicably connected to the target systems 2 via the network 3. For example, the behavior analysis system 1 may be communicably connected via the network 3 to a log collection system (not illustrated) that collects logs from the target systems 2. In such a case, logs generated by the target systems 2 are once collected by the log collection system and input to the behavior analysis system 1 from the log collection system via the network 3. Further, the behavior analysis system 1 according to the present example embodiment can also acquire a log from a storage medium that stores a log generated by the target system 2. In such a case, the target system 2 is not necessarily required to be connected to the behavior analysis system 1 via a network.

Figure 2:
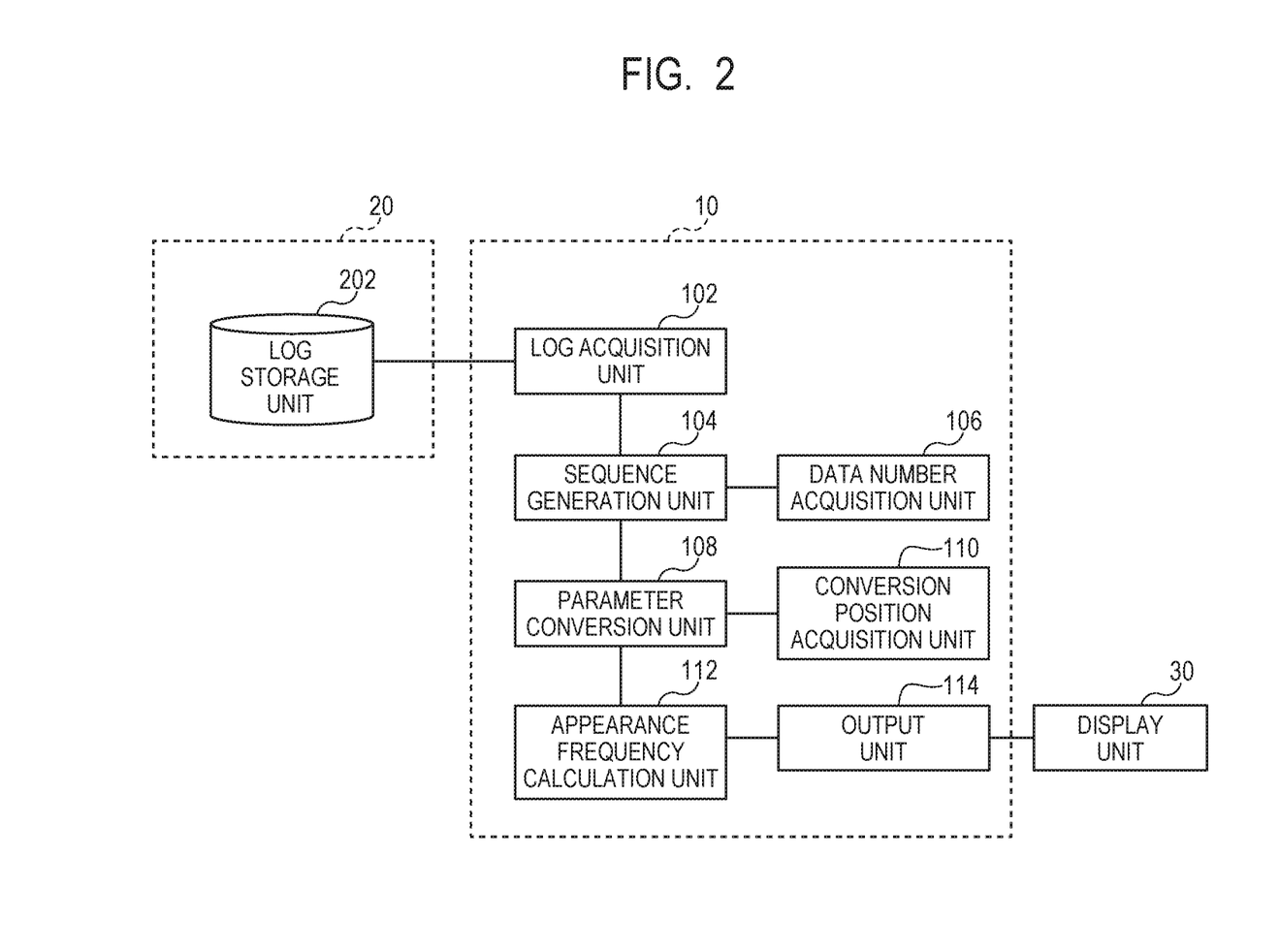
FIG. 2 is a block diagram illustrating a function configuration of the behavior analysis system according to the first example embodiment of the present invention.
Figure 3:
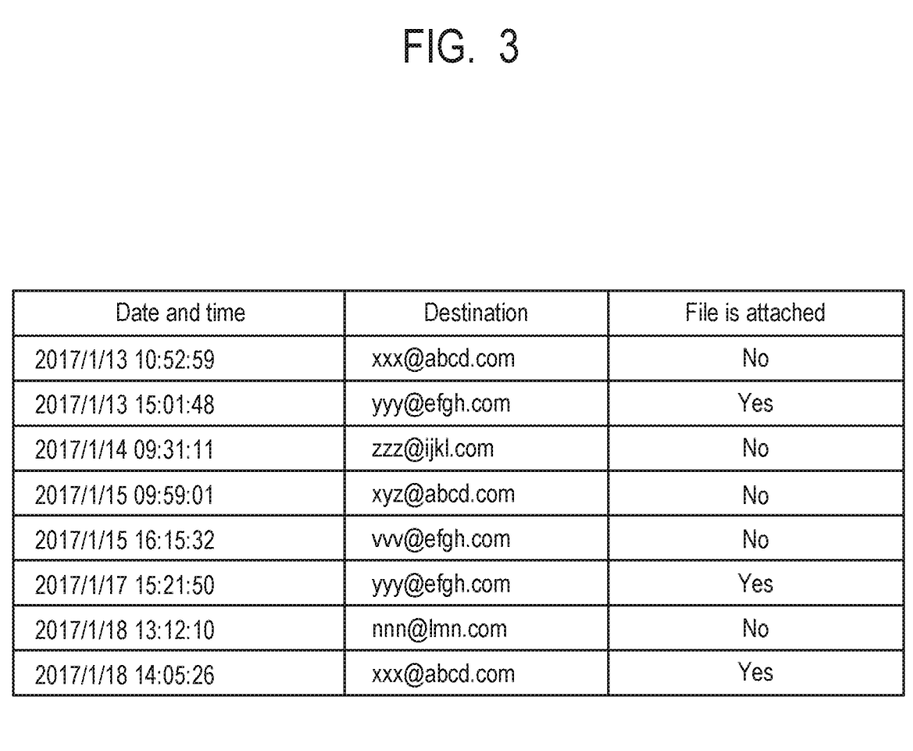
FIG. 3 is a table illustrating one example of a log according to the first example embodiment of the present invention.
Figure 4:
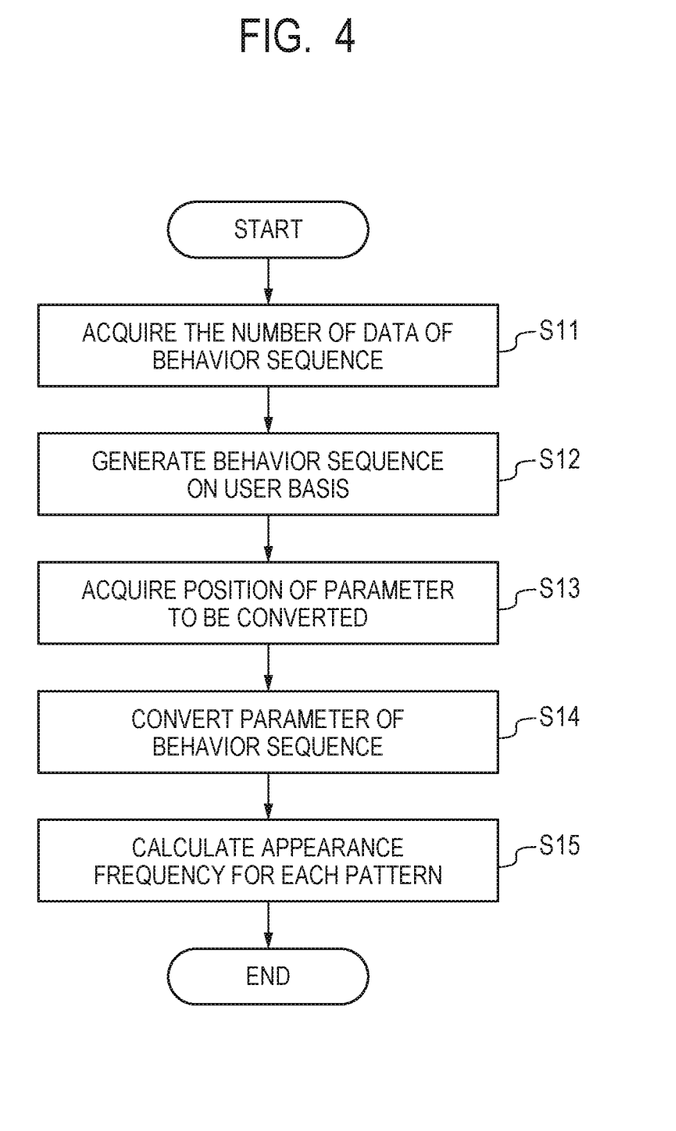
FIG. 4 is a flowchart illustrating a behavior analysis method using the behavior analysis system according to the first example embodiment of the present invention.
Figure 5:
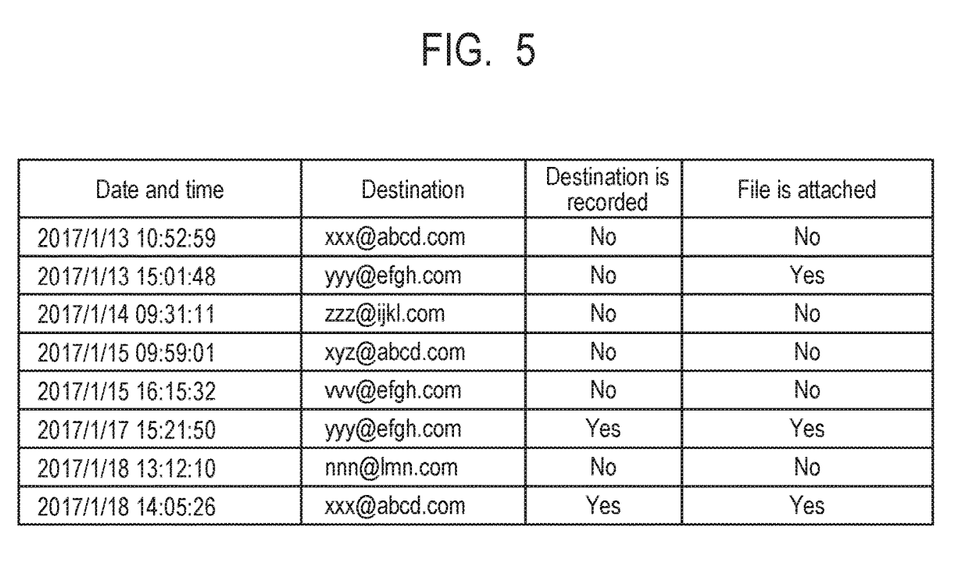
FIG. 5 is a table illustrating conversion of parameters according to the first example embodiment of the present invention.
Figure 6:
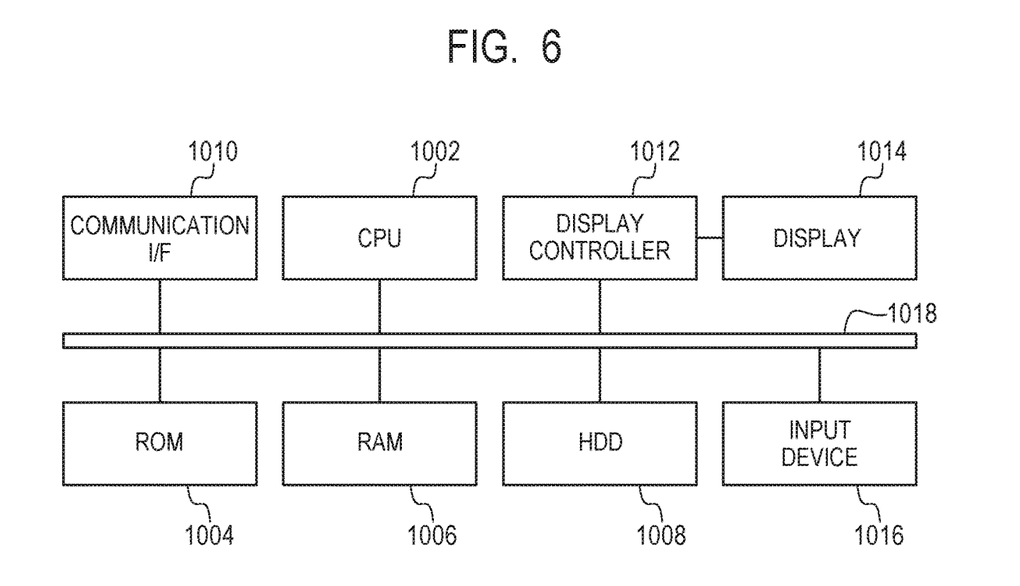
FIG. 6 is a block diagram illustrating one example of a hardware configuration of the behavior analysis system according to the first example embodiment of the present invention.

The specific configuration of the behavior analysis system according to the present example embodiment will be further described below by using FIG. 2 to FIG. 6. FIG. 2 is a block diagram illustrating a function configuration of the behavior analysis system according to the present example embodiment. FIG. 3 is a table illustrating one example of a log according to the present example embodiment. FIG. 4 is a flowchart illustrating a behavior analysis method using the behavior analysis system according to the present example embodiment. FIG. 5 is a table illustrating conversion of parameters according to the example embodiment. FIG. 6 is a block diagram illustrating one example of a hardware configuration of the behavior analysis system according to the present example embodiment.

As illustrated in FIG. 2, the behavior analysis system 1 according to the present example embodiment has a processing unit 10, a storage unit 20, and a display unit 30.

The processing unit 10 performs various processes for analyzing behavior in the target system 2. The processing unit 10 has a log acquisition unit 102, a sequence generation unit 104, a data number acquisition unit 106, a parameter conversion unit 108, a conversion position acquisition unit 110, an appearance frequency calculation unit 112, and an output unit 114.

The storage unit 20 has a log storage unit 202 that stores a log generated by the target system 2. The storage unit 20 is formed of a storage device described later, for example. The log generated by the target system 2 is input to the storage unit 20 regularly or irregularly or in real time and stored in the log storage unit 202. In this example, when there are multiple target systems 2, the log storage unit 202 can store a log for each of the target systems 2.

The display unit 30 is a device that displays a result of a process output by the processing unit 10. The display unit 30 is formed of an output device such as a display, a printer, or the like. Note that data of a process result may be transmitted to a device outside the behavior analysis system 1 instead of display on the display unit 30. Such another device that receives data may perform processing using the data if necessary or may perform display of the data. Further, the behavior analysis system 1 may be configured to store a process result in the storage unit 20 and transmit the process result to another device in response to a request from another device.

Logs to be processed by the behavior analysis system 1 according to the present example embodiment are logs that have been generated and output regularly or irregularly by the target system 2 or a component included therein. A log is an object that records behavior of a device such as a status in operation, behavior of a user using the target system 2, behavior of a person acquired by the target system 2, or the like. Further, a log may further include, in addition to the above, other information such as timestamp indicating the time of generation, an Internet Protocol (IP) address of a component that generates the log, a name of a component that generates the log, or the like. Further, for example, a log is one row or multiple rows of text data and can include one or more fields as a unit of information. A plurality of fields may be partitioned by a separator or a delimiter and may be continuous without being partitioned. A continuous field may be separated by a word, a morpheme, a character type, or the like.

A mail transmission history of a certain user, which is one example of a log to which the present example embodiment is applied, will be described with reference to FIG. 3. FIG.

3 illustrates a log in a form of a table indicating that a certain user has transmitted eight mails between Jan. 13, 2017 and Jan. 18, 2017. As illustrated in FIG. 3, a mail transmission history includes, as parameters, date and time when a mail is transmitted, a destination to which the mail is transmitted, and whether or not a file is attached. FIG. 3 displays these parameters separately in the first column to the third column. Further, each column of FIG. 3 corresponds to one behavior data, that is, one time of mail transmission. Therefore, FIG. 3 displays eight mail transmission histories separately in eight rows.

Note that the mail transmission history illustrated in FIG. is an example, and other parameters than the above may be further included. Further, while FIG. 3 is depicted in a form of a table for easier understanding, without being limited thereto, a mail transmission history may be stored in a form of data such as continuous text data without being partitioned as described above. While only the mail transmission history of one of the plurality of users is illustrated in FIG. 3 as an example, similar mail transmission histories are stored for other users.

The behavior analysis system 1 according to the present example embodiment is to perform behavior analysis of an analysis target by processing a log. The operation of each unit included in the processing unit 10 will be described below in detail along the flowchart of FIG. 4. Note that, while behavior analysis for the mail transmission history described above will be described below as an example, the present invention is not limited thereto.

The log acquisition unit 102 acquires a log stored in the log storage unit 202 in order to provide for a process in the sequence generation unit 104 in accordance with an instruction from the sequence generation unit 104.

The data number acquisition unit 106 acquires a set value for the number of data of a behavior sequence generated by the sequence generation unit 104 (step S11). The value of the number of data may be externally input by another device, an operator, or the like or may be acquired by reading a value stored in the storage unit 20 or the like. The number of data is the number of instances of behavior targeted for behavior analysis and corresponds to determination of the number of mail transmissions to be analyzed (the number of rows in the table of FIG. 3) in the example of the mail transmission history of FIG. 3. In the following description, the number of data acquired by the data number acquisition unit 106 is denoted as L.

The sequence generation unit 104 acquires L behavior data, which is the number of data acquired by the data number acquisition unit 106, from logs stored in the log storage unit 202 via the log acquisition unit 102. The sequence generation unit 104 then generates a behavior sequence including L behavior data on a user basis (step S12).

Generation of a behavior sequence will be described more specifically by using the example of the mail transmission history of FIG. 3. In this example, the value of L is 3, and "Destination" and "File is attached" that are parameters of the latest three mail transmissions selected based on transmission date and time are acquired from the mail transmission history of FIG. 3. At this time, the generated behavior sequence will be "yyy@efgh.com Yes, nnn@lmn.com No, xxx@abcd.com Yes". Each of a series of data partitioned by commas within a behavior sequence indicates one behavior data, and parameters included in one behavior data ("Destination" and "File is attached" in this example) are partitioned by spaces and displayed.

Note that, since the number of data used for generation of a behavior sequence is the latest L in this example and the behavior sequence has a fixed length, behavior sequences of the same length are generated for respective users. However, the behavior sequence may have a variable length. For example, a period acquisition unit that acquires a targeted data acquisition period instead of the data number acquisition unit 106 may be provided in the processing unit 10 so as to acquire behavior data within a predetermined period. Since the number of mail transmissions within the predetermined period is usually different for users, in such a case, behavior sequences having different lengths for respective users may be generated.

The conversion position acquisition unit 110 acquires the setting of a position of a parameter to be converted by the parameter conversion unit 108 (step S13). The setting of a position of a parameter may be externally input by another device, an operator, or the like or may be acquired by reading a value stored in the storage unit 20 or the like. In this example, a parameter to be converted is a parameter including a specific element that depends on an analysis target. For example, in the example of the mail transmission history of FIG. 3, "destination" on the second column is the specific parameter that depends on the user. Which destination to transmit a mail is significantly different for users who transmit mails, and this can be said to be a specific parameter that depends on the user. In this example, "second column" is set as the position of a parameter to be converted. Note that the setting of the position of a parameter may be defined by an element other than a column and, when an Identification (ID), a number, or the like is attached to each parameter in a log, the setting may be set by using such an attachment, for example.

The parameter conversion unit 108 converts, out of parameters included in a behavior sequence, a parameter of the position acquired by the conversion position acquisition unit 110 into a parameter which does not depend on the user in accordance with a predetermined rule (step S14). This predetermined rule may be a rule as to whether or not a similar behavior has occurred in the past, for example.

Conversion of a behavior sequence will be described more specifically by using the example of the mail transmission history of FIG. 3. Here, an example will be described in which "Destination" is converted based on whether or not a similar behavior has occurred in the past, that is, whether or not a past mail transmission to the same destination is recorded. FIG. 5 is a table illustrating conversion of parameters. FIG. 5 is a table in which an item of whether or not the destination is recorded is added to the table of FIG. 3. As one example, a mail transmission to yyy@efhg.com at 15:21:50 on Jan. 17, 2017 illustrated on the sixth row is focused on. For this mail transmission, since there is a history of a transmission to the same destination (yyy@efhg.com) at 15:1:48 on Jan. 13, 2017 on the second row, whether or not the destination is recorded is "Yes".

A behavior sequence is converted by replacing the parameter of "destination" of the behavior sequence with a parameter of "destination is recorded" that does not depend on the user. Specifically, the behavior sequence "yyy@efgh.com Yes, nnn@lmn.com No, xxx@abcd.com Yes" described above is converted into "Yes Yes, No No, Yes Yes". The converted behavior sequence includes no parameter that depends on the user, such as a mail address of a destination and thus can be handled as a parameter common to a plurality of users.

The appearance frequency calculation unit 112 calculates an appearance frequency for each pattern of a parameter included in the converted behavior sequence generated on a user basis and generates a list of appearance frequencies (step S15). For example, when there are 120 users whose converted behavior sequence is a pattern "Yes Yes, No No, Yes Yes", "(Yes Yes, No No, Yes Yes), 120" is one element in the list of appearance frequencies.

The output unit 114 outputs a list of the converted behavior sequence and the appearance frequency on the display unit 30 as a behavior model obtained by behavior analysis.

In referencing the output list of the appearance frequency, if there is only one user whose pattern of the converted behavior sequence is "No Yes, Yes No, No Yes" out of 1000 users, it can be said that this user performs abnormal behavior (mail transmission) that is different from other users. Further, by referencing a user corresponding to a behavior sequence, it is possible to identify a user performing abnormal behavior.

The behavior analysis system 1 described above is formed of a computer device, for example. One example of a hardware configuration of the behavior analysis system 1 will be described by using FIG. 6. Note that the behavior analysis system 1 may be formed of a single device or may be formed of two or more physically separated devices connected by a wire or wirelessly.

As illustrated in FIG. 6, the behavior analysis system 1 has a central processing unit (CPU) 102, a read only memory (ROM) 1004, a random access memory (RAM) 1006, and a hard disk drive (HDD) 1008. Further, the behavior analysis system 1 has a communication interface (I/F) 1010. Further, the behavior analysis system 1 has a display controller 1012 and a display 1014. Furthermore, the behavior analysis system 1 has an input device 1016. The CPU 1002, the ROM 1004, the RAM 1006, the HDD 1008, the communication I/F 1010, the display controller 1012, and the input device 1016 are connected to a common bus line 1018.

The CPU 1002 controls the entire operation of the behavior analysis system 1. Further, the CPU 1002 executes a program that implements the function of each unit of the log acquisition unit 102, the sequence generation unit 104, the data number acquisition unit 106, the parameter conversion unit 108, the conversion position acquisition unit 110, the appearance frequency calculation unit 112, and the output unit 114 in the processing unit 10. The CPU 1002 implements the function of each unit in the processing unit 10 by loading a program stored in the HDD 1008 or the like to the RAM 1006 and executing the program.

The ROM 1004 stores a program such as a boot program. The RAM 1006 is used as a working area when the CPU 1002 executes a program. Further, the HDD 1008 stores a program used for executing the CPU 1002.

Further, the HDD 1008 is a storage device that implements the function of the log storage unit 202 in the storage unit 20. Note that the storage device that implements the function of the log storage unit 202 is not limited to the HDD 1008 as long as it is nonvolatile type and may be, for example, a flash memory or the like.

The communication I/F 1010 controls communication of data with the target system 2 connected to the network 3. The communication I/F 1010 implements the function of the log acquisition unit 102 in the processing unit 10 together with the CPU 1002.

The display 1014 that functions as the display unit 30 is connected to the display controller 1012. The display controller 1012 functions as the output unit 114 together with the CPU 1002 and causes the display 1014 to display an image based on the output data.

The input device 1016 is a human interface such as a keyboard, a mouse, or the like, for example. Further, the input device 1016 may be a touchscreen embedded in the display 1014. An operator of the behavior analysis system 1 may input a setting of the behavior analysis system 1, input an execution instruction of a process, or the like via the input device 1016.

Note that the hardware configuration of the behavior analysis system 1 is not limited to the configuration described above and may be various configurations.

Advantages of the present example embodiment will be described. In detecting a feature that appears commonly to behavior of analysis targets such as a plurality of users or devices, suitable modeling may not be performed when a parameter which depends on the analysis targets is included in behavior data. For example, when multiple instances of behavior even having similarity depends on an analysis target and appears to be different behavior, such similarity may not be recognized.

For example, behavior in which a user A repeatedly transmits mails with an attached file to a destination X and behavior in which a user B repeatedly transmits mails with an attached file to a destination Y are different in the destination. Thus, in a model using a destination as a parameter, the above instances appear to be different behavior.

However, if it is possible to exclude dependency on a user and perform modeling, a common feature of mails with an attached file being repeatedly transmitted to the same destination can be found in these instances of behavior. Accordingly, in this example, it is more suitable to exclude dependency on a user and perform modeling.

In the present example embodiment, by converting a specific parameter that depends on a user (destination) in a behavior sequence into a parameter that does not depend on a user (whether or not the destination is record), it is possible to handle the converted parameter as a parameter common to a plurality of users and detect a feature. Therefore, a behavior analysis system that can perform more suitable modeling is provided.

Second Example Embodiment

A behavior analysis system and a behavior analysis method according to a second example embodiment of the present invention will be described by using FIG. 7 and FIG. 8. In the description below, the same configuration as that in the first example embodiment may be omitted or simplified.

Figure 7:
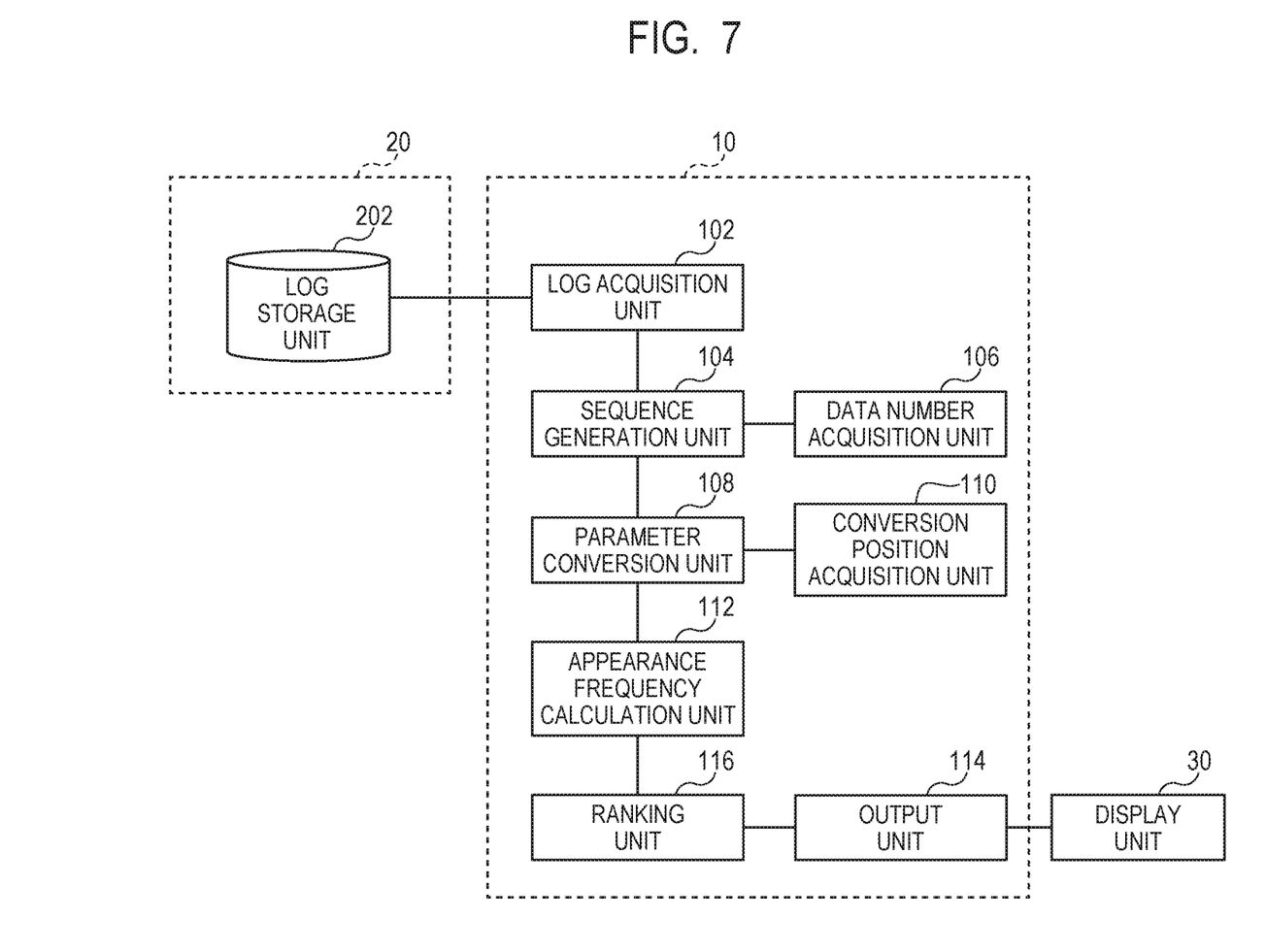
FIG. 7 is a block diagram illustrating a function configuration of the behavior analysis system according to a second example embodiment of the present invention.
Figure 8:
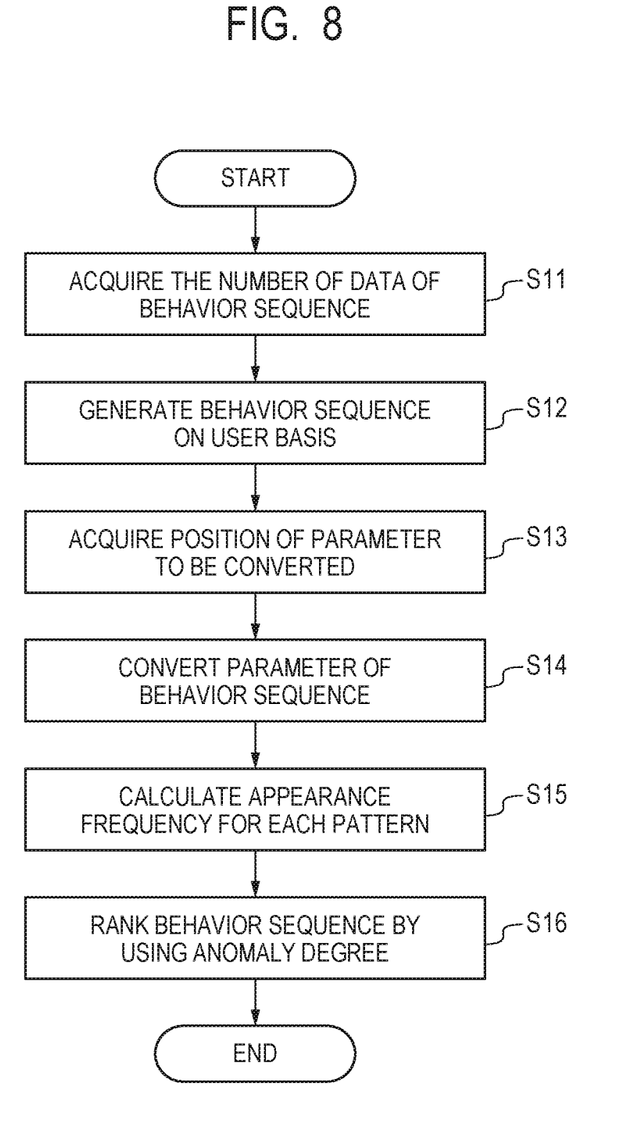
FIG. 8 is a flowchart illustrating a behavior analysis method using the behavior analysis system according to the second example embodiment of the present invention.

FIG. 7 is a block diagram illustrating a function configuration of the behavior analysis system according to the present example embodiment. FIG. 8 is a flowchart illustrating the behavior analysis method using the behavior analysis system according to the present example embodiment. As illustrated in FIG. 7, the behavior analysis system of the present example embodiment further has a ranking unit 116 that ranks (determines ranks of) behavior sequences in accordance with an anomaly degree of behavior. The ranking unit 116 ranks behavior sequences by using an index of an anomaly degree of behavior based on at least one of the content and the appearance frequency of a behavior sequence (step S16). A ranking result thereof is output to the display unit 30 from the output unit 114 together with a list of converted behavior sequences and appearance frequencies.

Some examples of a ranking method in the ranking unit 116 will be described. A first example is an example in which the appearance frequency is used as an index of an anomaly degree. In general, behavior of a lower appearance frequency is likely to be more abnormal behavior. Therefore, by sorting a plurality of behavior sequences in ascending order of appearance frequency, it is possible to rank the behavior sequences.

The scheme described above enables easy ranking. However, when behavior included in behavior sequences includes a large number of types and is complex or when the number of analysis targets is large, a large number of behavior sequences whose appearance frequencies have the same value or close values may be presented, which may make it difficult to determine behavior to be focused on as abnormal behavior.

Accordingly, as a second example, an example of a ranking method using a randomness of behavior in behavior sequences as an index of an anomaly degree will be described. The number of behavior data included in a behavior sequence is denoted as L, and the number of types of behavior included in a behavior sequence is denoted as K. In this example, for example, since K/L can be handled as a value corresponding to a randomness, this can be used as the index of the anomaly degree. By sorting a plurality of behavior sequences in ascending order of K/L, it is possible to rank the behavior sequences.

Calculation of K/L will be described with a specific example. When the value of L is 3 and the behavior sequence is "Yes Yes, Yes Yes, Yes Yes", since the type of behavior is only one type: "Yes Yes", the value of K is 1. Therefore, the value of K/L is calculated to be 1/3. On the other hand, when the behavior sequence is "Yes No, No Yes, Yes Yes", since the type of behavior includes three types: "Yes No", "No Yes", and "Yes Yes", the value of K is 3. Therefore, the value of K/L is calculated to be 1. As discussed above, the value of K/L is close to 1 when behavior varies and the randomness thereof is higher, and the value of K/L is close to 0 when behavior occurs regularly and the randomness thereof is lower.

When two sequences "Yes Yes, Yes Yes, Yes Yes" and "Yes No, No Yes, Yes Yes" occur at the same appearance frequency, the former having a higher regularity has a higher anomaly degree than the latter having a higher randomness and thus is the behavior to be focused on. This is because the behavior having a high randomness is likely to occur by accident and the behavior having a high regularity is likely to occur for some reason. The second example enables ranking taking the content of behavior into consideration. Further, since the values are less likely to be the same even when behavior included in behavior sequences includes a large number of types and is complex or even when the number of analysis targets is large, this has an advantage of easy determination of the behavior to be focused on as abnormal behavior.

In a third example, a product of an appearance frequency in the first example and a K/L in the second example is used as an index of an anomaly degree. By sorting a plurality of behavior sequences in ascending order of the product of the appearance frequency and the K/L, it is possible to rank the behavior sequences. For example, when the value of the appearance frequency is 12 and the value of the K/L is 2/8, the product thereof is 3. The smaller the appearance frequency and the K/L are, the higher the anomaly degree is, and thus the smaller the value of the product thereof is, the higher the anomaly degree is. This example enables ranking taking both the appearance frequency and the randomness into consideration. Further, when behavior included in behavior sequences includes a large number of types and is complex or when the number of analysis targets is large, the values are less likely to be the same than in the second example, and this has an advantage of easy determination of the behavior to be focused on as abnormal behavior.

As described above, in the present example embodiment, it is possible to output a ranking result using an index of an anomaly degree based on at least one of the content and the appearance frequency of a behavior sequence in addition to having the advantage of the first example embodiment. This enables the user of the behavior analysis system to easily determine behavior having a high anomaly degree from output behavior sequences.

Third Example Embodiment

Figure 9:
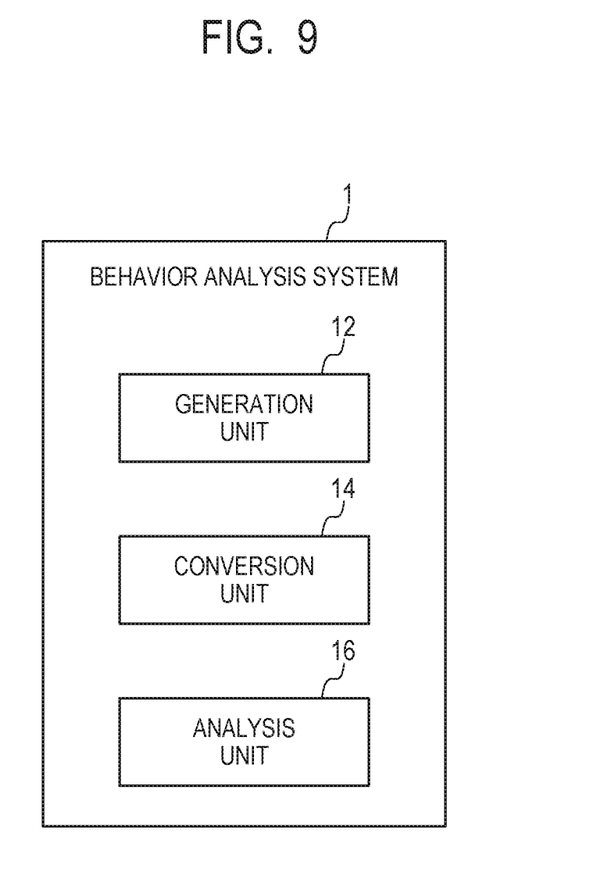
FIG. 9 is a block diagram illustrating a function configuration of the behavior analysis system according to a third example embodiment of the present invention.

The behavior analysis system described in each of the above example embodiments may be configured as illustrated in FIG. 9 according to a third example embodiment. FIG. 9 is a block diagram illustrating a function configuration of a behavior analysis system according to the third example embodiment.

As illustrated in FIG. 9, the behavior analysis system 1 according to the third example embodiment has a generation unit 12 that generates a behavior data group including a plurality of behavior data on an analysis target basis. Further, the behavior analysis system 1 has a conversion unit 14 that converts the behavior data group of each of a plurality of analysis targets by converting a parameter which depends on an analysis target out of parameters included in the behavior data group into a parameter which does not depend on an analysis target. Further, the behavior analysis system 1 has an analysis unit 16 that performs analysis by using the converted behavior data group of the plurality of analysis targets. Thereby, the behavior analysis system 1 that can perform more suitable modeling when detecting a feature appearing commonly to behavior of a plurality of users or devices is provided.

Modified Example Embodiments

While the present invention has been described above with reference to the example embodiments, the present invention is not limited to the example embodiments described above. Various modifications that may be appreciated by those skilled in the art can be made to the configuration and details of the present invention within the scope not departing from the spirit of the present invention.

For example, while the behavior sequence arranged in the order based on occurrence time of behavior is used as a form of a behavior data group used in behavior analysis in the example embodiments described above, the form of data is not limited to a sequence. For example, a "set" including no information on order may be used. While "Yes No, No No, Yes Yes" and "No No, Yes Yes, Yes No" are considered as different data in the case of "sequence", these are handled as the same data in the case of "set" because the order is not considered. A more suitable form of data can be selected and used depending on the application of the behavior analysis system or the content of a behavior history. Note that "behavior sequence" and "set" may be referred to as "behavior data group" in general.

Further, in the example embodiments described above, behavior analysis may be performed by using a log that has already been stored in the log storage unit 202, and this can be said to be a static and offline process in a sense of analysis using data that has already been acquired by the behavior analysis system 1. However, the present invention may be dynamic type that acquires data online and perform a process when behavior occurs, and such an example will be described. In this example, a list of behavior sequences and occurrence frequencies acquired in the past is generated and stored in the storage unit 20 in advance. When behavior such as a mail transmission newly occurs, the behavior analysis system 1 acquires the behavior data thereof and generates a behavior sequence of the user of interest. The behavior analysis system 1 compares this behavior sequence with the stored list to calculate and output the appearance frequency, the anomaly degree, the ranking result, or the like of the behavior sequence. Thereby, it is possible to detect abnormal behavior immediately when the behavior occurs. Further, when behavior such as a mail transmission newly occurs, update of the list of behavior sequences and appearance frequencies may be performed in addition to the process described above.

Further, while behavior analysis of a mail transmission history as an example of applying the present invention to a technical field of a mail system or information communication has been illustrated in the above example embodiments, the present invention is also applicable to other technical fields than the mail system or the information communication.

For example, the present invention can be applied to behavior analysis of a delivery history in transportation business. It is possible to detect an abnormal delivery, an abnormal order, or the like by recording a history of a delivered item, a delivery destination, or a type of a delivery service for each user in advance and performing behavior analysis of delivery behavior, order behavior, or the like on this history.

Further, for example, the present invention can be applied to behavior analysis of a use history of a credit card in retail business or financial business. It is possible to detect an abnormal use of a credit card, an unauthorized use of a card by others, or the like by recording a history of a used credit card, a purchased item, or the like for each user in advance and performing behavior analysis on this history.

As described above, the present invention can be applied to behavior analysis of users or devices in various fields and thereby enables detection of an anomaly, an unauthorized use, or the like of a user or a device.

The scope of each of the example embodiments further includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a compact disk-read only memory (CD-ROM), a magnetic tape, a nonvolatile memory card, or a ROM can be used. Further, the scope of each of the example embodiments includes an example that operates on Operating System (OS) to perform a process in cooperation with another software or a function of an add-in board without being limited to an example that performs a process by an individual program stored in the storage medium.

Further, a service implemented by the function of each of the example embodiments described above may be provided to a user in a form of Software as a Service (SaaS).

The whole or part of the example embodiments disclosed above can be described as, but not limited to, the following supplementary notes.

(Supplementary Note 1)

A behavior analysis system comprising:

a generation unit that generates a behavior data group including a plurality of behavior data on an analysis target basis;

a conversion unit that converts the behavior data group of each of a plurality of analysis targets by converting a parameter which depends on the analysis target out of parameters included in the behavior data group into a parameter which does not depend on the analysis target; and an analysis unit that performs analysis by using the converted behavior data group of the plurality of analysis targets.

(Supplementary Note 2)

The behavior analysis system according to supplementary note 1, wherein the conversion unit converts a parameter which depends on the analysis target into a parameter indicating whether or not the same behavior was performed in the past.

(Supplementary Note 3)

The behavior analysis system according to supplementary note 1 or 2, wherein the analysis unit calculates an appearance frequency for each pattern of a parameter included in the converted behavior data group of the plurality of analysis targets.

(Supplementary Note 4)

The behavior analysis system according to supplementary note 3 further comprising a ranking unit that ranks the behavior data group by using an abnormal degree of behavior based on at least one of behavior included in the converted behavior data group and the appearance frequency.

(Supplementary Note 5)

The behavior analysis system according to supplementary note 4, wherein the ranking unit performs the ranking by using a randomness of behavior included in the converted behavior data group of the plurality of analysis targets as an index of the anomaly degree.

(Supplementary Note 6)

The behavior analysis system according to supplementary note 4 or 5, wherein the ranking unit performs the ranking based on K/L, where the number of behavior data included in the behavior data group is L, and the number of types of behavior included in the behavior data group is K.

(Supplementary Note 7)

The behavior analysis system according to supplementary note 6, wherein the ranking unit performs the ranking based on a product of K/L and the appearance frequency.

(Supplementary Note 8)

The behavior analysis system according to any one of supplementary notes 1 to 7, wherein the behavior data group is a sequence in which a plurality of behavior data included in the behavior data group are arranged in order based on occurrence time of behavior.

(Supplementary Note 9)

A behavior analysis method comprising:

generating a behavior data group including a plurality of behavior data on an analysis target basis;

converting the behavior data group of each of a plurality of analysis targets by converting a parameter which depends on the analysis target out of parameters included in the behavior data group into a parameter which does not depend on the analysis target; and performing analysis by using the converted behavior data group of the plurality of analysis targets.

(Supplementary Note 10)

A storage medium storing a program that causes a computer to perform:

generating a behavior data group including a plurality of behavior data on an analysis target basis;

converting the behavior data group of each of a plurality of analysis targets by converting a parameter which depends on the analysis target out of parameters included in the behavior data group into a parameter which does not depend on the analysis target; and performing analysis by using the converted behavior data group of the plurality of analysis targets.

The invention claimed is:

1. A behavior analysis system comprising:
at least one processor, wherein the at least one processor is configured to implement at least:
  a generation unit that generates a behavior data group including a plurality of behavior data on an analysis target basis;
  a conversion unit that converts the behavior data group of each of a plurality of analysis targets by converting a parameter which depends on the analysis target out of parameters included in the behavior data group into a parameter which does not depend on the analysis target;
  an analysis unit that performs analysis by using the converted behavior data group of the plurality of analysis targets; and
  a ranking unit,
  wherein the analysis unit calculates an appearance frequency for each pattern of a parameter included in the converted behavior data group of the plurality of analysis targets,
  wherein the ranking unit ranks the behavior data group by using an abnormal degree of behavior based on at least one of behavior included in the converted behavior data group and the appearance frequency,
  wherein the ranking unit performs the ranking based on K/L, where the number of behavior data included in the behavior data group is L, and the number of types of behavior included in the behavior data group is K, and
  wherein the ranking unit performs the ranking based on a product of K/L and the appearance frequency.

2. The behavior analysis system according to claim 1, wherein the conversion unit converts a parameter which depends on the analysis target into a parameter indicating whether or not the same behavior was performed in the past.

3. The behavior analysis system according to claim 1, wherein the ranking unit performs the ranking by using a randomness of behavior included in the converted behavior data group of the plurality of analysis targets as an index of the anomaly degree.

4. The behavior analysis system according to claim 1, wherein the behavior data group is a sequence in which a plurality of behavior data included in the behavior data group are arranged in order based on occurrence time of behavior.

5. A behavior analysis method comprising:
generating a behavior data group including a plurality of behavior data on an analysis target basis;
converting the behavior data group of each of a plurality of analysis targets by converting a parameter which depends on the analysis target out of parameters included in the behavior data group into a parameter which does not depend on the analysis target; and
performing analysis by using the converted behavior data group of the plurality of analysis targets,
wherein the performing analysis include calculating an appearance frequency for each pattern of a parameter included in the converted behavior data group of the plurality of analysis targets,
wherein the behavior analysis method further comprises ranking the behavior data group by using an abnormal degree of behavior based on at least one of behavior included in the converted behavior data group and the appearance frequency,
wherein the ranking is performed based on K/L, where the number of behavior data included in the behavior data group is L, and the number of types of behavior included in the behavior data group is K, and
wherein the ranking is performed based on a product of K/L and the appearance frequency.

6. A non-transitory storage medium storing a program that causes a computer to perform:
generating a behavior data group including a plurality of behavior data on an analysis target basis;
converting the behavior data group of each of a plurality of analysis targets by converting a parameter which depends on the analysis target out of parameters included in the behavior data group into a parameter which does not depend on the analysis target; and
performing analysis by using the converted behavior data group of the plurality of analysis targets,
wherein the performing analysis include calculating an appearance frequency for each pattern of a parameter included in the converted behavior data group of the plurality of analysis targets,
wherein the program is further configured to cause the computer to perform ranking the behavior data group by using an abnormal degree of behavior based on at least one of behavior included in the converted behavior data group and the appearance frequency,
wherein the ranking is performed based on K/L, where the number of behavior data included in the behavior data group is L, and the number of types of behavior included in the behavior data group is K, and
wherein the ranking is performed based on a product of K/L and the appearance frequency.

* * * * *